(12) United States Patent
Kleffel

(10) Patent No.: US 9,053,869 B2
(45) Date of Patent: Jun. 9, 2015

(54) ENERGY STORAGE APPARATUS

(75) Inventor: Rüdiger Kleffel, Hersbruck (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 811 days.

(21) Appl. No.: 13/117,241

(22) Filed: May 27, 2011

(65) Prior Publication Data

US 2012/0139492 A1 Jun. 7, 2012

(30) Foreign Application Priority Data

May 28, 2010 (DE) .......................... 10 2010 029 427

(51) Int. Cl.
| | |
|---|---|
| H02J 7/00 | (2006.01) |
| H01G 9/26 | (2006.01) |
| H01G 9/00 | (2006.01) |
| H02J 7/34 | (2006.01) |

(52) U.S. Cl.
CPC ................. *H01G 9/26* (2013.01); *H01G 9/155* (2013.01); *H02J 7/0016* (2013.01); *H02J 7/345* (2013.01); *Y02E 60/13* (2013.01); *Y02T 10/7022* (2013.01); *Y02T 10/7055* (2013.01)

(58) Field of Classification Search
USPC .................................. 320/118, 119, 125, 116
See application file for complete search history.

(56) References Cited

U.S. PATENT DOCUMENTS

| | | | |
|---|---|---|---|
| 6,140,800 A | 10/2000 | Peterson | |
| 6,205,036 B1 | 3/2001 | Anzawa | |
| 7,667,437 B2 * | 2/2010 | Johnson et al. | 320/150 |
| 7,800,346 B2 | 9/2010 | Bolz et al. | |
| 7,804,276 B2 * | 9/2010 | Roessler | 320/118 |
| 8,253,378 B2 * | 8/2012 | Lee et al. | 320/118 |
| 2001/0019256 A1 * | 9/2001 | Olsson et al. | 320/118 |

(Continued)

FOREIGN PATENT DOCUMENTS

| | | |
|---|---|---|
| CN | 12 75 829 A | 12/2000 |
| DE | 102005034588 A1 | 2/2007 |

(Continued)

OTHER PUBLICATIONS

Texas Instruments, Datenblatt zu bq76PL102, Oct. 2009; Others; 2009.

(Continued)

*Primary Examiner* — Richard Isla Rodas
*Assistant Examiner* — Michael DiBenedetto
(74) *Attorney, Agent, or Firm* — Henry M. Feiereisen LLC

(57) ABSTRACT

Improved energy storage apparatus that is compact and less expensive is disclosed. High-voltage lines are no longer required, and heat energy can be simply dissipated from each storage module in the apparatus. A switchable inductive balancing element is electrically connected in parallel with each storage cell in each storage module, through which energy or electrical charge can be shifted among the individual storage cells in each storage module using suitably designed magnetic circuits. A power resistor and a module switch are electrically connected in parallel with the series circuit formed by the storage cells in of each storage module and the switchable inductive cell balancing elements in each module are magnetically coupled to a single switchable inductive module balancing element in the module, or each is magnetically coupled to a switchable inductive balancing element of a respective transformer.

15 Claims, 4 Drawing Sheets

(56) References Cited

U.S. PATENT DOCUMENTS

| | | | |
|---|---|---|---|
| 2003/0141843 A1* | 7/2003 | Anzawa et al. | 320/118 |
| 2006/0238165 A1 | 10/2006 | Moore | |
| 2007/0247115 A1 | 10/2007 | Ishikawa | |
| 2008/0211457 A1* | 9/2008 | Rudorff et al. | 320/118 |
| 2008/0272735 A1 | 11/2008 | Roessler | |
| 2009/0278496 A1* | 11/2009 | Nakao et al. | 320/118 |
| 2009/0284224 A1* | 11/2009 | Miyazaki et al. | 320/118 |
| 2010/0090649 A1* | 4/2010 | Sardat et al. | 320/118 |
| 2010/0148726 A1* | 6/2010 | Lee et al. | 320/118 |
| 2010/0194339 A1* | 8/2010 | Yang et al. | 320/116 |
| 2010/0289453 A1* | 11/2010 | Firehammer et al. | 320/118 |
| 2010/0295510 A1* | 11/2010 | Moussaoui et al. | 320/118 |
| 2011/0121785 A1* | 5/2011 | Iida et al. | 320/118 |
| 2011/0169453 A1* | 7/2011 | Maruyama et al. | 320/118 |
| 2012/0001595 A1* | 1/2012 | Maruyama et al. | 320/118 |
| 2012/0025769 A1* | 2/2012 | Kikuchi et al. | 320/118 |

FOREIGN PATENT DOCUMENTS

| | | |
|---|---|---|
| DE | 102008021090 A1 | 11/2008 |
| WO | WO 0215363 A2 | 2/2002 |
| WO | WO 2006000471 A1 | 1/2006 |

OTHER PUBLICATIONS

Linear Technology Datenblatt zu LTC6802-1, 2009; Others; 2009.
Analog Devices Datenblatt zu AD7280, 2008; Others; 2008.
Keiju Matsui, Takayoshi Suzuki, Hiroto Shimada, Masaru Hasegawa EPE 2009 Barcelona, P1 bis P10; Others;, 2009.

* cited by examiner

ENERGY STORAGE APPARATUS

CROSS-REFERENCES TO RELATED APPLICATIONS

This application claims the priority of German Patent Application, Serial No. 10 2010 029 427.6, filed May 28, 2010, pursuant to 35 U.S.C. 119(a)-(d), the content(s) of which is/are incorporated herein by reference in its entirety as if fully set forth herein.

BACKGROUND OF THE INVENTION

The present invention relates to an energy storage apparatus having at least two storage modules that are electrically connected in series. Each storage module has a multiplicity of storage cells that are electrically connected in series. The following discussion of related energy storage art is provided to assist the reader in understanding the advantages of the invention. It is not to be construed as an admission that this related art is prior art to this invention.

The storage modules for energy storage apparatus of this type have rechargeable batteries cells or double layer capacitors as storage cells. Rechargeable batteries and double layer capacitors are rechargeable charge stores which, in the charged state, can make electrical power available for a load. The voltage at which that power is made available is dependent on the type of charge store. In the case of lithium ion rechargeable batteries, that voltage is in the neighborhood of approximately 3.3V, and approximately 2.5V in the case of double layer capacitors. In order to supply loads that require higher voltages, it is known for a plurality of storage cells to be connected in series to form a storage cell bank. In this case, the supply voltage provided by such a storage cell apparatus corresponds to the sum of the individual cell voltages of the series-connected storage cells.

During the charging of the series-connected storage cells, it is unavoidable that voltage differences arise among the storage cells in a storage cell bank—designated hereinafter as a storage "module"—owing to capacitance tolerances. Thus, in order to optimally utilize the capability of the storage cells of a storage module for energy storage, a uniform or "balanced" voltage distribution among the storage cells of the storage module has to be achieved by charge equalization.

For an electric motor, such as that of a hybrid vehicle, for example, the required voltage exceeds the voltage of an individual storage module. In the event that the required supply voltage is significantly higher than the voltage of the storage module, a plurality of storage modules have to be electrically connected in series. This also applies to high-voltage apparatus such as trams. In those applications, in particular, a large number of storage modules are electrically connected in series, each storage module having a multiplicity of storage cells that are also electrically connected in series, in energy storage apparatus having m storage modules, it is necessary balance the m storage modules among one another, in addition to balancing the n storage cells in each of the m storage modules.

There are two types of methods for balancing of the storage cells in each storage module in an energy storage apparatus, namely dissipative and regenerative methods. In the dissipative methods, the storage cells in a storage module are discharged by part of their stored charge being converted into heat, in non-reactive resistors for example. In the regenerative methods, the excess energy or charge in individual storage cells of a storage module is redistributed to other storage cells of the storage module. Dissipative methods are disclosed in "Lithium Ion Battery Monitoring System AD7280" from Analog Devices, 2008, and in "Multicell Battery Stack Monitor LTC6802-1" from Linear Technology, 2009, for example.

Multiple storage modules in an energy storage apparatus can be balanced among one another by all n storage cells in each module being discharged simultaneously, so that stored energy is converted into heat. The disadvantage there is that a high level of thermal power is produced, and dissipating that thermal power produced in the individual storage modules poses problems.

Regenerative methods are subdivided into inductive methods and capacitive methods. Inductive methods are disclosed in "PowerLAN™ Dual-Cell Li-Ion Battery Monitor With PowerPump™ Cell Balancing" from Texas Instruments, 2009, and from DE 102008021090 A1, for example. Capacitive methods are disclosed in the EPE publication, Barcelona 2009, entitled "Analysis and Improvements of Novel Voltage Balancer for an Electric Double Layer Capacitor Employing a CW circuit".

Balancing the m storage modules of an energy storage apparatus among one another by regenerative methods is only is possible if additional high-voltage cables are provided between the m storage modules and the terminals of the energy storage apparatus, which requires a considerable additional outlay. It would be desirable and advantageous to provide an improved storage apparatus that obviates prior art shortcomings by addressing this problem. Thus the invention provides energy storage apparatus having a plurality of storage modules in which an inductive regenerative balancing method can be employed without the use of additional high-voltage cables.

SUMMARY OF THE INVENTION

In accordance with the invention, inductive storage module elements in each storage module are electrically connected in parallel with the series circuit formed by the storage cells of that storage module. Each storage module also has a series circuit including a power resistor and a module switch that is electrically connected parallel with the series circuit formed by the storage cells of the storage module. Each storage module of the energy storage apparatus is adapted to be selectively discharged, as a whole, by the power resistor. Thus, the storage modules of the energy storage apparatus can be balanced among one another in a plurality of steps, without those storage modules having to be interconnected with terminals of the energy storage apparatus by means of high-voltage cables, and the heat loss in each storage module then occurs in a respective power resistor, where it can easily be dissipated.

In a preferred embodiment, each storage module has a module control device that is linked to control signal inputs of the cell switches and the module switch.

In a particular preferred embodiment, the energy storage apparatus includes a transformer for each pair of magnetically coupled inductive storage cell and module elements in a storage module. Preferably, the transformer having multiple secondary windings, and a primary winding is provided for all the magnetically coupled inductive storage module elements of the storage module. Also, preferably, the inductive storage module element is a switchable inductor.

Preferably the storage cells and the power resistor in each storage module are thermally conductively connected to a module heat sink.

In particular embodiments, the cell switch and/or the module switch are a turn-off semiconductor switch, such as a transistor, in particular, and preferably a field effect transistor.

In one particular embodiment, the storage cell is a rechargeable battery, preferably a lithium ion cell.

In another particular embodiment, the storage cell is a double layer capacitor.

BRIEF DESCRIPTION OF THE DRAWINGS

Other features and advantages of the present invention will be more readily apparent upon reading the following description of currently preferred exemplified embodiments of the invention with reference to the accompanying drawing, in which.

Figure 1:
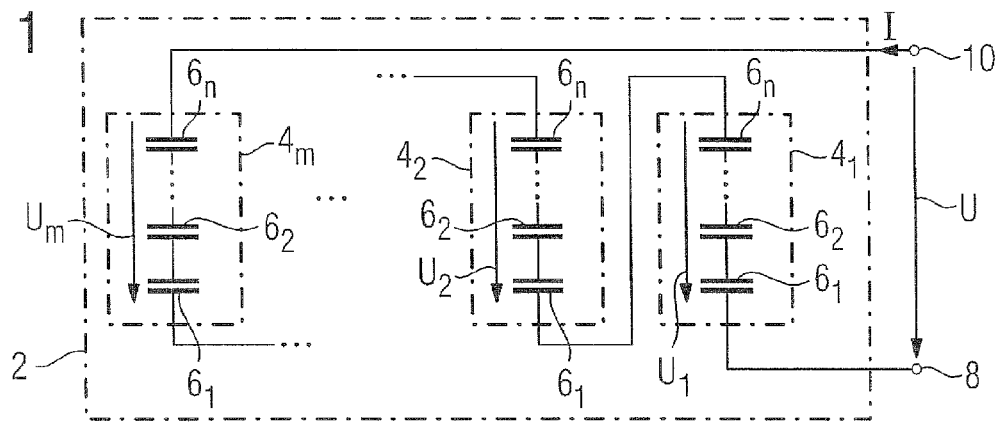
FIG. 1 is a circuit diagram of energy storage apparatus having multiple storage modules.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

DETAILED DESCRIPTION OF PREFERRED EMBODIMENTS

Turning now to the drawings, FIG. 1 shows an energy storage apparatus 2 for high-voltage applications. This energy storage apparatus 2 has m storage modules $4_1$ to $4_m$, which are electrically connected in series. Each storage module $4_1, \ldots, 4_m$ has a series circuit formed by a plurality of cells $6_1$ to $6_n$. One terminal of the storage module $4_1$, and of the storage module $4_m$ each form a respective terminal 8 or 10 of the energy storage apparatus 2. When a charging voltage U is applied to those terminals 8, 10, a charging current I flows into the energy storage apparatus 2. The amplitude of the charging voltage U used may correspond to an intermediate circuit voltage of a hybrid vehicle or of the traction converter of a tram—from a value of several hundred volts to a few thousand volts.

To provide a storage voltage U of 820V, for example, eight storage modules $4_1, \ldots, 4_8$ each having forty-eight storage cells $6_1, \ldots, 6_{48}$ that are electrically connected in series, are interconnected to form an energy storage apparatus 2. If such an energy storage apparatus 2 is interconnected with an intermediate circuit of a traction converter of a tram, it is particularly advantageous if double layer capacitors are in each case used as storage cells $6_1, \ldots, 6_{48}$. Double layer capacitors are preferred in the case of a traction drive since they can take up and release a high electrical power. By contrast, rechargeable batteries can store high quantities of energy relative to their volume and weight, but can take up and release said quantities of energy only relatively slowly. For these reasons, the choice of a type of storage cells is generally dependent on the specific application.

Owing to capacitance tolerances of the storage cells $6_1$ to $6_n$ of the m storage modules $4_1$ to $4_m$ of an energy storage apparatus 2, different voltages of the n storage cells $6_1$ to $6_n$ in each storage module $4_1$ to $4_m$ and thus also in the m storage module $4_1$ to $4_m$ of the energy storage apparatus 2 unavoidably arise during the charging of the n storage cells $6_1$ to $6_n$ electrically connected in series in the m storage modules $4_1$ to $4_m$. In order to be able to optimally utilize the capability of the n storage cells $6_1$ to $6_n$ of the m storage module $4_1$ to $4_m$ for energy storage, a uniform—also designated as balanced—voltage distribution of the n storage cells $6_1$ to $6_n$ and of the m storage modules $4_1$ to $4_m$ of the energy storage apparatus 2 has to be achieved by charge equalization.

Figure 2:
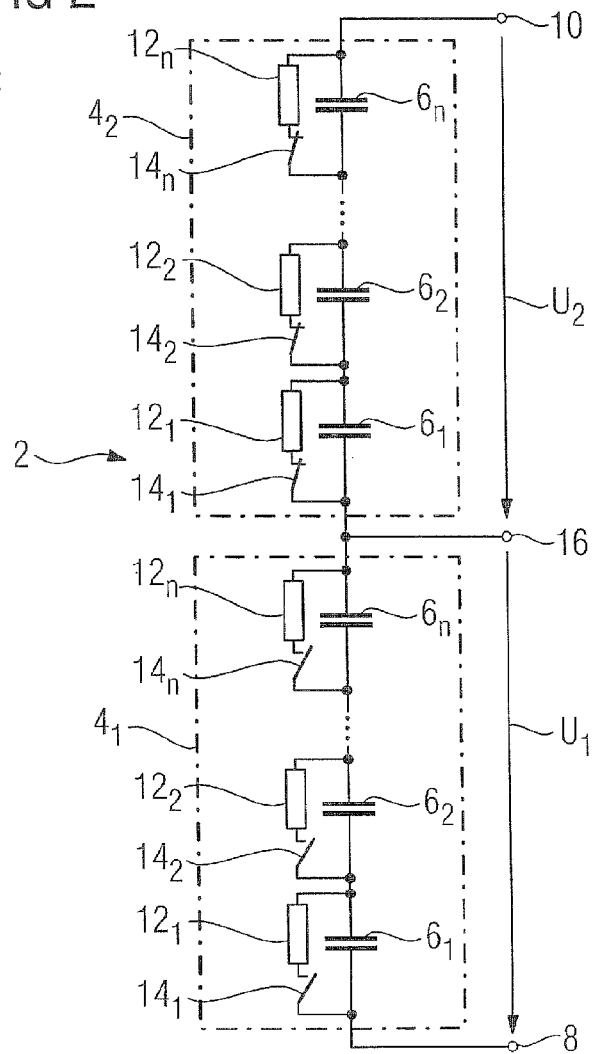
FIG. 2 is a circuit diagram of known means for dissipative balancing of two storage modules in an energy storage apparatus.
Figure 3:
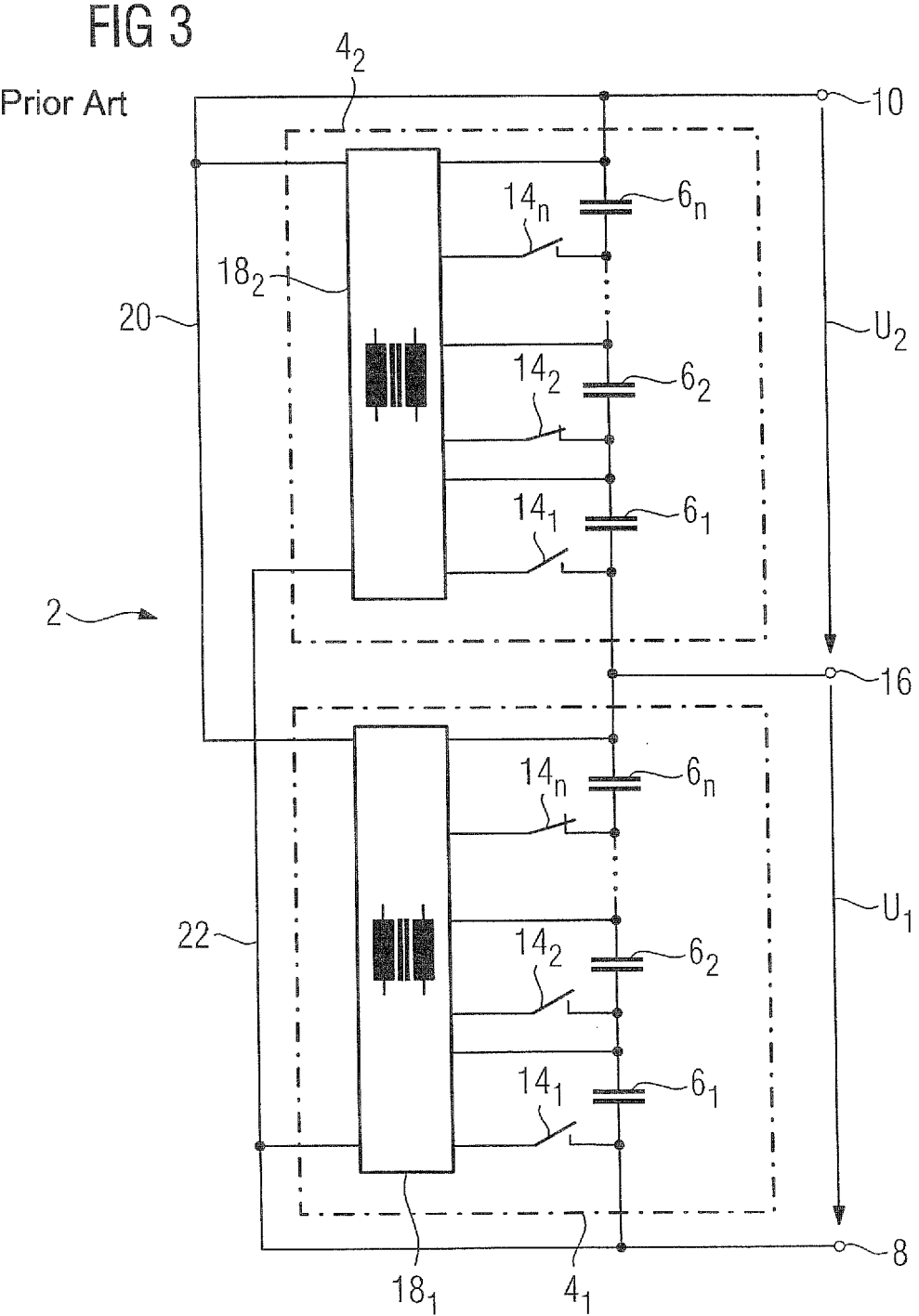
FIG. 3 is a circuit diagram of known means for regenerative inductive balancing of two storage modules in an energy storage apparatus.

FIG. 2 and FIG. 3 illustrate a known balancing method and only two storage modules $4_1$ and $4_2$ of the energy storage apparatus 2 shown in FIG. 1 are illustrated, for the sake of clarity. In FIG. 2, a series circuit having a respective cell resistor $12_1$ to $12_n$ and a cell switch $14_1$ to $14_n$ is electrically connected in parallel with each storage cell $6_1$ to $6_n$ of a storage module $4_1$ and $4_2$. The cell resistors $12_1$ to $12_n$ are also known as "balancing resistors". Turn-off semiconductor switches, in particular field effect transistors, are in each case used as cell switches $14_1$ to $14_n$. The cell switches $14_1$ to $14_n$ of the storage module $4_2$ of the energy storage apparatus 2 are closed. As a result, the storage cells $6_1$ to $6_n$ of this storage module $4_2$ are discharged in order to establish the balance between the two module voltages $U_1$ and $U_2$. In order to be able to detect these module voltages $U_1$ and $U_2$, the junction point of two storage modules $4_2$ and $4_1$ is led out as terminal 16. After the storage cells $6_1$ to $6_n$ of the storage module $4_2$ have been discharged by a predetermined value, the closed cell switches $14_1$ to $14_n$, are opened again. As a result, the charging operation is continued. The temporary discharge of one or more storage modules $4_1$ to $4_m$ of the energy storage apparatus 2 according to FIG. 1 is repeated until the module voltages $U_1$ to $U_m$ thereof approximately correspond to one another. If not all of the cell switches $14_1$ to $14_n$ are closed simultaneously, then the storage cells $6_1$ to $6_n$ of a storage module $4_1$ to $4_m$ can also be balanced among one another according to this method.

The disadvantage of this known balancing apparatus is that stored energy is converted into heat energy in the cell resistors $12_1$ to $12_n$ which has to be dissipated from each storage module $4_1$ to $4_m$ of this energy storage apparatus 2.

In FIG. 3, likewise only two storage modules $4_1$ and $4_2$ of the energy storage apparatus 2 shown in FIG. 1 are shown, to illustrate the explanation of a further known balancing method, namely the regenerative inductive method. In this apparatus, too, each storage cell $6_1$ to $6_n$ of a storage module $4_1$ or $4_2$ has a cell switch $14_1$ to $14_n$, which together with an inductive storage cell element is in each case electrically connected in parallel with a storage cell $6_1$ to $6_n$. In each storage module $4_1$ and $4_2$, at least one inductive storage module element is electrically connected in parallel with the series circuit of the storage modules $4_1$ and $4_2$, said at least one inductive storage module element in each case being magnetically coupled to inductive storage cell elements of the n storage cells $6_1$ to $6_n$ by means of a coupling element.

These inductive storage cell elements, the inductive storage module element and the coupling element in each storage module $4_1$ or $4_2$ form a respective inductive storage apparatus $18_1$ and $18_2$ in FIG. 3. This inductive storage apparatus $18_1$ and $18_2$ which is also, functionally, balancing apparatus, can be multiple cell transformers or a module transformer having multiple secondary windings. For example, together with cell switches $14_1$ to $14_n$ the cell transformers, or else the module transformer, form flyback converter circuits. The electrically parallel switched primary windings of the cell transformers, or the primary winding of the module transformer, are electrically connected to the terminals 10 and 8 of the storage modules $4_2$ and $4_1$ of the energy storage apparatus 2, so that the secondary winding are electrically adapted to be switchable in parallel with a respective storage cell $6_1$ to $6_n$ of a storage module $4_1$ or $4_2$.

In order to equalize charge states in FIG. 3, energy is drawn from the storage module $4_1$ or $4_2$ having a series circuit formed by the individual cell stores $6_1$ to $6_n$ in a first operating mode of the storage module $4_1$ or $4_2$. In storage cell $6_2$ when the associated cell switch $14_2$ is closed, energy stored in the magnetic circuit of the inductive balancing apparatus $18_2$ is drawn. In storage cell 6 of storage module $4_1$ the cell switch $14_n$ is closed so that energy is drawn and stored in the magnetic circuit of the inductive balancing apparatus $18_1$. In a second operating mode, the energy stored in the magnetic circuit is transferred to all the secondary windings of the respective inductive storage apparatus $18_2$ or $18_1$ of the storage module $4_2$ or $4_1$ and fed via these secondary windings into the individual cell stores $6_1$ to $6_n$ of the respective storage module $4_1$ or $4_2$. As a result, the charge states of the individual cell stores $6_1$ to $6_n$ in each of the storage modules $4_1$ and $4_2$ of the energy storage apparatus 2 are matched. The primary windings of the respective inductive balancing apparatus $18_1$ and $18_2$ in the two storage modules $4_1$ and $4_2$ are electrically connected in parallel by the connecting lines 20 and 22. That is to say that the entire charging voltage U of the energy storage apparatus 2 is present at the respective primary winding of an inductive balancing apparatus $18_1$ or $18_2$. Because high voltages occur at the terminals 10 and 8, the connecting lines 20 and 22 must be high-voltage lines. A regenerative inductive balancing method is used in this embodiment of the energy storage apparatus 2 that, apart from parasitic losses, converts no energy into heat has to be dissipated from the individual storage modules $4_1$ to $4_m$ of the storage apparatus 2, shown in FIG. 1. However, the downside is that the storage modules $4_1$ to $4_m$ of this energy storage apparatus 2 have to be interconnected with the high-voltage lines 20, 22.

In addition to this inductive method, further regenerative inductive and capacitive balancing methods are known, which require a corresponding respective embodiment of the balancing apparatus $18_1$ and $18_2$. What these methods have in common, however, is that the high-voltage lines 20 and 22 are required for balancing the storage modules $4_1$ to $4_m$. The inventive inductive method described herein is a presently preferred embodiment of a different regenerative balancing method.

Figure 4:
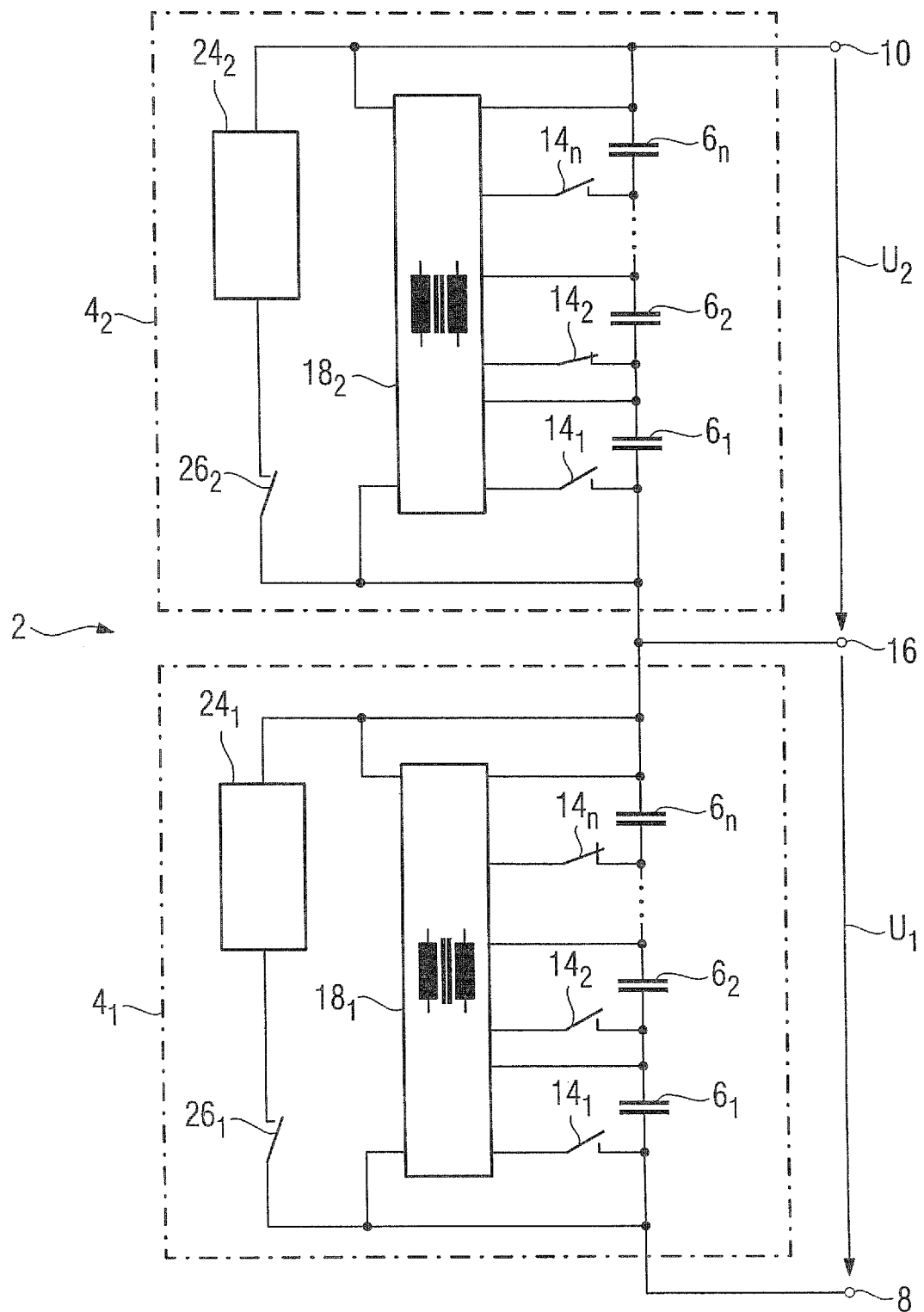
FIG. 4 is a circuit diagram illustration of an energy storage apparatus according to the invention.

In accordance with the invention, the energy storage apparatus 2 in FIG. 4 differs from the energy storage apparatus 2 in accordance with FIG. 3 in that a respective series circuit formed by a respective power resistor $24_1$ or $24_2$ and a respective module switch $26_1$ or $26_2$, is electrically connected in parallel with the series circuit formed by the n storage cells $6_1$ to $6_n$ of each storage module $4_1$ or $4_2$, and high-voltage lines 20 and 22 are no longer present. The storage modules $4_1$ and $4_2$ of the energy storage apparatus 2 are balanced among one another by the discharge of the storage modules $4_1$ and $4_2$ using the series circuit formed by the respective power resistor $24_1$ or $24_2$ and module switch $26_1$ and $26_2$, that are electrically connected in parallel with the module terminals 8, 16, and 16, 10, respectively. High voltage is applied across the respective module's power resistor $24_1$ or $24_2$ by closing the associated module switch $26_1$ or $26_2$, respectively. The m storage modules $4_1$ to $4_m$ of the energy storage apparatus 2 are balanced among one another by this dissipative balancing. However, the balancing of the n storage cells $6_1$ to $6_n$ of each storage module $4_1$ to $4_m$ is effected regeneratively. Because of this additional dissipative balancing that uses a respective power resistor $24_1$ or $24_2$ in each storage module $4_1$ to $4_m$ of the energy storage apparatus 2 shown in FIG. 1, high-voltage lines 20, 22 are no longer required for interconnecting the storage modules $4_1$ to $4_m$ of the energy storage apparatus 2. As a result, not only is the outlay for this assembly reduced, but the energy storage apparatus 2 can also be constructed more compactly.

In FIG. 4, the heat loss generated in a respective power resistor $24_1$ to $24_m$, of an energy storage apparatus 2 has to be dissipated from each storage module $4_1$, to $4_m$. In accordance with the preferred embodiment of the invention, shown in FIG. 5, each storage module $4_1$ to $4_m$ of an energy storage apparatus 2 has a module heat sink $28_1$ to $28_m$, that cools the storage cells $6_1$ to $6_n$ in each module.

Figure 5:
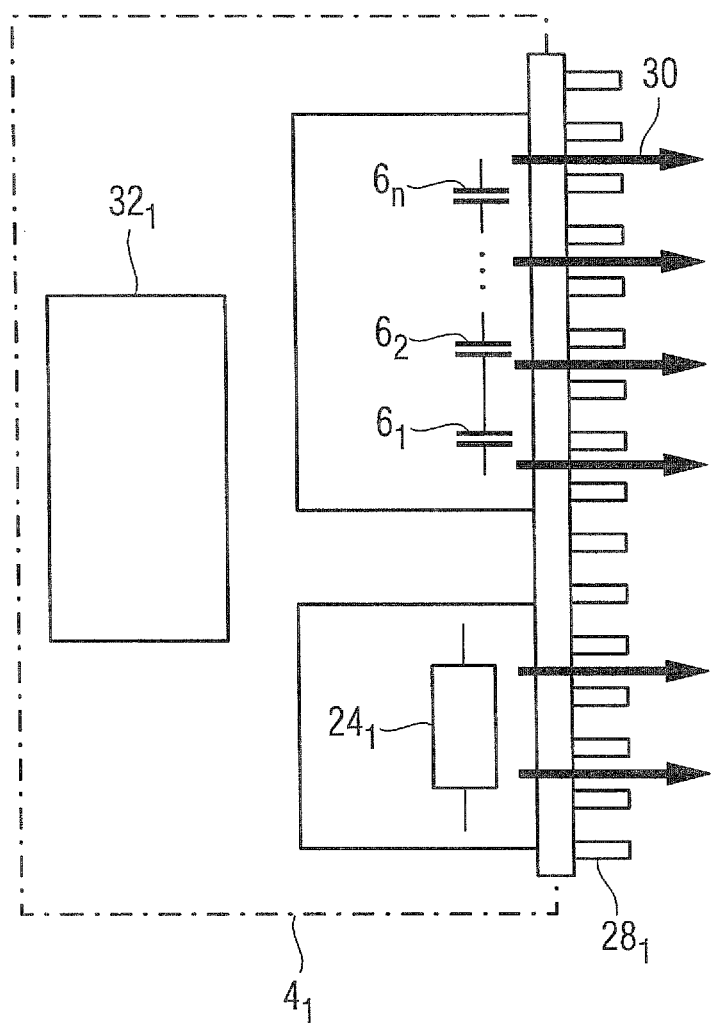
FIG. 5 is a schematic diagram of a storage module of the energy storage apparatus according to FIG. 4 showing the heat flow in the module.

In FIG. 5, the power resistor $24_1$ is thermally conductively connected to a respective module heat sink 28. The storage cells $6_1$ to $6_n$ of said storage module $4_1$ are, likewise, thermally conductively connected to said module heat sink $28_1$. The heat loss generated in that module is thus dissipated from that storage module $4_1$ by means of the module heat sink $28_1$. FIG. 5 illustrates the heat flow 30 from this storage module $4_1$ in accordance with the invention. The module heat sink $28_1$ shown in FIG. 5 is an air-cooled heat sink. However, a liquid-cooled heat sink or a cooling plate can also be used as the module heat sink $28_1$. For example, storage modules $4_1$ to $4_m$ of an energy storage apparatus 2 that each have a cooling plate as their module heat sink $28_1$ to $28_m$ can be mounted together onto a heat sink in a hybrid vehicle or in a traction converter of a tram.

Since cell switches $14_1$ to $14_n$ and the module switch $26_1$ of a storage module $4_1$ have to be actuated to balance voltage within the storage cells $4_1$ to $4_m$ and the modules $4_1$ to $4_m$ of an energy storage apparatus 2 among one another, a respective module control device $32_1$ to $32_m$ is provided in each storage module $4_1$ to $4_m$ of the energy storage apparatus 2. The n cell switches $14_1$ to $14_n$ of a module $4_1$ to $4_m$ and the respective module switch $26_1, 26_2, \ldots, 26_m$ are actuated, depending on the given storage cell voltages and the module voltage $U_1$, $U_2, \ldots, U_m$. The cell voltages in each case represent a measure of the charge state of a storage cell $6_1$ to $6_n$ of a module $4_1$ to $4_m$.

In accordance with the invention, not only are the charge states the n individual n storage cells $6_1$ to $6_n$ shown in each of the m storage modules $4_1$ to $4_m$ of said energy storage apparatus 2 shown in FIG. 1 matched to one another at the end of a charging operation, but also the charge states of the storage modules $4_1$ to $4_m$ in said energy storage apparatus 2 are matched among one another. Since the high-voltage lines 20 and 22 for the interconnection of m storage modules $4_1$ to $4_m$ in the energy storage apparatus 2 are no longer required, an energy storage apparatus 2 of this type can be constructed more compactly. Moreover, defective and worn-out storage modules $4_1$ to $4_m$ in an given energy storage apparatus 2 can be exchanged for new storage modules without a high outlay, since the storage modules $4_1$ to $4_m$ of an energy storage apparatus 2 are no longer interconnected among one another by means of high-voltage lines 20 and 22.

Which embodiment of the n storage cells $6_1$ to $6_n$ of the m storage modules $4_1$ to $4_m$ of an energy storage apparatus 2 are used depends on where the particular energy storage apparatus 2 is intended to be used. If the apparatus is to be used in a hybrid vehicle, rechargeable battery cells, in particular lithium ion cells, are used, whereas in a traction drive, for example of a tram, double layer capacitors are preferred for use as the storage cells $6_1$ to $6_n$. The advantage of using rechargeable batteries is that they can store and release large quantities of energy. On the other hand, the advantage of the double layer capacitors is that they can store and release high levels of electrical energy. For example, with an applied voltage of 820 in a high-voltage application, the energy storage apparatus 2 consists of eight storage modules $4_1$ to $4_8$ each having forty-eight storage cells $6_1$ to $6_{48}$. Since high-voltage lines 20, 22 are no longer required for the interconnection of the individual storage modules $4_1$ to $4_8$ with the terminals 10 and 8 of the energy storage apparatus 2, energy storage apparatus 2 comprising storage modules $4_1$ to $4_m$ can be constructed very compactly for that high-voltage application in accordance with the invention, and without great expense.

While the invention has been shown and described with reference to currently preferred embodiments, it is not limited to these details since variations and modifications may be made without departing in any way from the spirit and scope of the present invention. The embodiments were chosen and described in order to explain the principles of the invention and its practical application, so as to enable a person skilled in the art to utilize the invention in a manner suited to the particular use contemplated.

What is claimed is:

1. Energy circuit apparatus comprising:
    at least two storage modules, said modules being electrically connected in a series circuit, said modules each having a multiplicity of storage cells that are electrically connected in series;
    a switched inductive storage cell element having an inductive storage cell element and a cell switch connected in series, each of said storage cells having an inductive storage cell element connected in parallel with it;
    at least one inductive storage module element electrically connected in parallel with the series circuit formed by the storage cells in each storage module;
    a coupling element magnetically coupling respective switched inductive storage elements to at least one inductive storage module element; and
    a switched power resistor element having a power resistor and a module switch electrically connected in parallel with the series circuit formed by the storage cells of each storage module.

2. The apparatus of claim 1 wherein the cell switches and module switch in each module have respective control signal inputs, said apparatus further comprising:
    a module control device in each storage module, said module control device being connected to the control signal inputs of the cell switches and of the module switch.

3. The apparatus of claim 1, further comprising:
    a transformer in each storage module connected to magnetically couple an inductive storage module element to an inductive storage cell element in said storage module.

4. The apparatus of claim 1, further comprising:
    a transformer having a primary winding and multiple secondary windings, each secondary winding providing a respective magnetically coupled inductive storage cell element for a cell in said storage module.

5. The apparatus of claim 1 wherein said inductive storage element is a switchable inductor.

6. The apparatus of claim 1, further comprising:
    a module heat sink in each module, the storage cells and the power resistor being thermally conductively connected to the module heat sink.

7. The apparatus of claim 1, wherein a turn-off semiconductor switch is the cell switch.

8. The apparatus of claim 7, wherein a transistor is the turn-off semiconductor switch.

9. The apparatus of claim 8, wherein the transistor is a field-effect transistor.

10. The apparatus of claim 1, wherein a turn-off semiconductor switch is the module switch.

11. The apparatus of claim 10, wherein a transistor is the turn-off semiconductor switch.

12. The apparatus of claim 11, wherein the transistor is a field-effect transistor.

13. The apparatus of claim 1, wherein a rechargeable battery is provided as a storage cell.

14. The apparatus of claim 13, wherein a lithium ion cell is the rechargeable battery.

15. The apparatus of claim 1, wherein a double layer capacitor is provided as a storage cell.

* * * * *